(12) United States Patent
Goldman et al.

(10) Patent No.: US 7,716,534 B2
(45) Date of Patent: May 11, 2010

(54) METHODS AND APPARATUS FOR MEASURING PERFORMANCE IN PROCESSING SYSTEM

(75) Inventors: Stuart Owen Goldman, Scottsdale, AZ (US); Richard E. Krock, Naperville, IL (US); Karl F. Rauscher, Emmaus, PA (US); James Philip Runyon, Wheaton, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 452 days.

(21) Appl. No.: 11/744,549

(22) Filed: May 4, 2007

(65) Prior Publication Data

US 2008/0276126 A1 Nov. 6, 2008

(51) Int. Cl.
*G06F 11/00* (2006.01)
(52) U.S. Cl. .......................................... 714/47; 702/182
(58) Field of Classification Search ................... 714/47, 714/34
See application file for complete search history.

(56) References Cited

U.S. PATENT DOCUMENTS

| | | | | |
|---|---|---|---|---|
| 5,684,947 A | * | 11/1997 | Horie | 714/37 |
| 5,699,505 A | * | 12/1997 | Srinivasan | 714/31 |
| 5,768,496 A | * | 6/1998 | Lidgett et al. | 714/25 |
| 5,796,939 A | * | 8/1998 | Berc et al. | 714/47 |
| 5,951,696 A | * | 9/1999 | Naaseh et al. | 714/34 |
| 6,289,379 B1 | * | 9/2001 | Urano et al. | 709/223 |
| 6,643,802 B1 | * | 11/2003 | Frost et al. | 714/37 |
| 6,857,084 B1 | * | 2/2005 | Giles | 714/35 |
| 7,100,033 B2 | * | 8/2006 | Roth et al. | 713/1 |
| 7,159,144 B2 | * | 1/2007 | Babu et al. | 714/35 |
| 7,484,125 B2 | * | 1/2009 | Wei | 714/36 |
| 2007/0079177 A1 | * | 4/2007 | Spirakis et al. | 714/34 |
| 2009/0157359 A1 | * | 6/2009 | Chernoff | 702/186 |

\* cited by examiner

*Primary Examiner*—Marc Duncan
(74) *Attorney, Agent, or Firm*—Ryan, Mason & Lewis, LLP

(57) ABSTRACT

Techniques are disclosed for measuring performance in processing systems such as communications systems and computing systems. For example, a method of measuring performance in a processing system having a plurality of processing devices includes the following steps. A measurement system coupled to the plurality of processing devices generates an interrupt signal. The measurement system applies the interrupt signal to a set of processing devices under test, wherein the set of processing devices under test is selected from the plurality of processing devices, such that each processing device of the set under test makes data available to the measurement system. The available data represents data associated with the execution of at least one function performed by each processing device of the set under test. The measurement system obtains the available data and utilizes at least a portion of the available data to determine a measure of performance associated with each of the processing devices of the set under test.

23 Claims, 3 Drawing Sheets

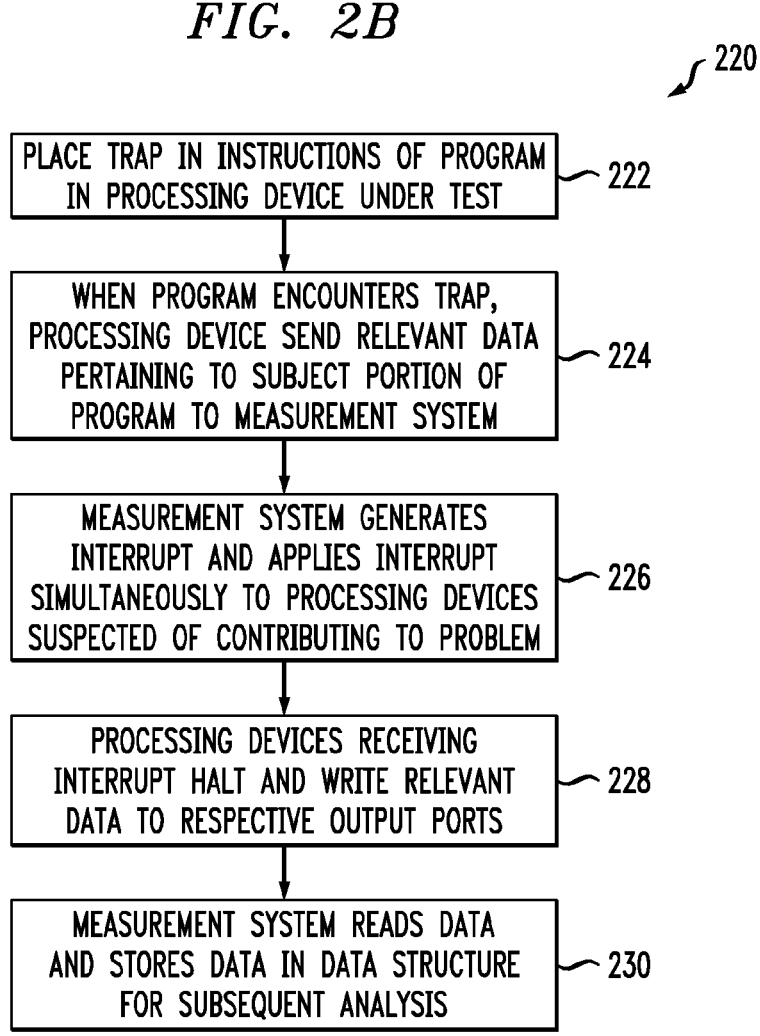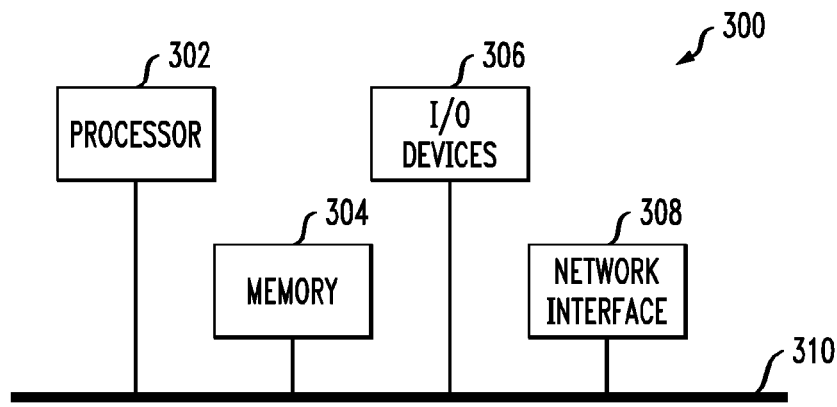

METHODS AND APPARATUS FOR MEASURING PERFORMANCE IN PROCESSING SYSTEM

FIELD OF THE INVENTION

The present invention relates to processing systems such as communications systems and computing systems. More particularly, the present invention relates to techniques for measuring performance in such systems.

BACKGROUND OF THE INVENTION

It is known that in most processing systems, such as communications systems and computing systems, next generation products typically tend to be more complex as compared with products developed from predecessor technologies. Furthermore, in any such system, there are typically a number of dissimilar processes running on a multitude of dissimilar platforms. When the system works, the results can be impressive. However, when there are capacity issues or failures that can not be attributed to a particular processing device in the system, it is increasingly difficult to quickly isolate errors and resolve problems.

The schemes used by existing processing systems do not adequately address the need to be able to measure the time actually expended in each routine in each processing device under various traffic patterns, as compared to static projections, nor are they able to correlate the processes being simultaneously executed in each of the multiple processing devices in a complex, distributed system.

SUMMARY OF THE INVENTION

Principles of the present invention provide techniques for measuring performance in processing systems.

For example, in one aspect of the invention, a method of measuring performance in a processing system having a plurality of processing devices includes the following steps. A measurement system coupled to the plurality of processing devices generates an interrupt signal. The measurement system applies the interrupt signal to a set of processing devices under test, wherein the set of processing devices under test is selected from the plurality of processing devices, such that each processing device of the set under test makes data available to the measurement system. The available data represents data associated with the execution of at least one function performed by each processing device of the set under test. The measurement system obtains the available data and utilizes at least a portion of the available data to determine a measure of performance associated with each of the processing devices of the set under test.

The interrupt signal is preferably generated by the measurement system after a random delay expires. The random delay may be adjustable. The interrupt signal may be simultaneously sent to each processing device of the set under test. The set of processing devices under test may include one or more of the plurality of processing devices.

Further, in one embodiment, the interrupt signal may be generated by the measurement system in response to receipt of an interrupt and data from at least one processing device of the plurality of processing devices. The processing device sends the interrupt and data to the measurement system in response to an occurrence of a triggering event in the processing device. The triggering event may include the occurrence of program code being executed in the processing device reaching a trap set therein.

Still further, in another embodiment, the measurement system maintains a data structure containing the obtained available data. The data structure includes a partitioning that represents distinct execution modules contained in each of the plurality of processing devices. By way of example only, the data structure may be a map or a table.

The data made available by each of the processing devices of the set under test preferably includes address register data that is written to a designated output port of each of the processing devices of the set under test such that each of the processing devices of the set under test can return to execution of the function after writing the address register data to the designated output port.

The determined performance measure may represent an actual performance measure such that the actual performance measure can be compared to a predicted performance measure to decide whether each of the processing devices of the set under test is operating correctly. The processing system may be at least part of a communications system or a computing system.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2B illustrates a method of measuring performance in one or more processing devices of a processing system according to another embodiment of the present invention.

FIG. 3 illustrates a performance measurement system according to one embodiment of the present invention.

DETAILED DESCRIPTION OF PREFERRED EMBODIMENTS

While principles of the present invention are generally applicable to any processing system, including but not limited to communications systems and computing systems, such principles are particularly well suited for use in a distributed processing system such as a Universal Mobile Telecommunications System (UMTS) mobile switching office.

Figure 1:
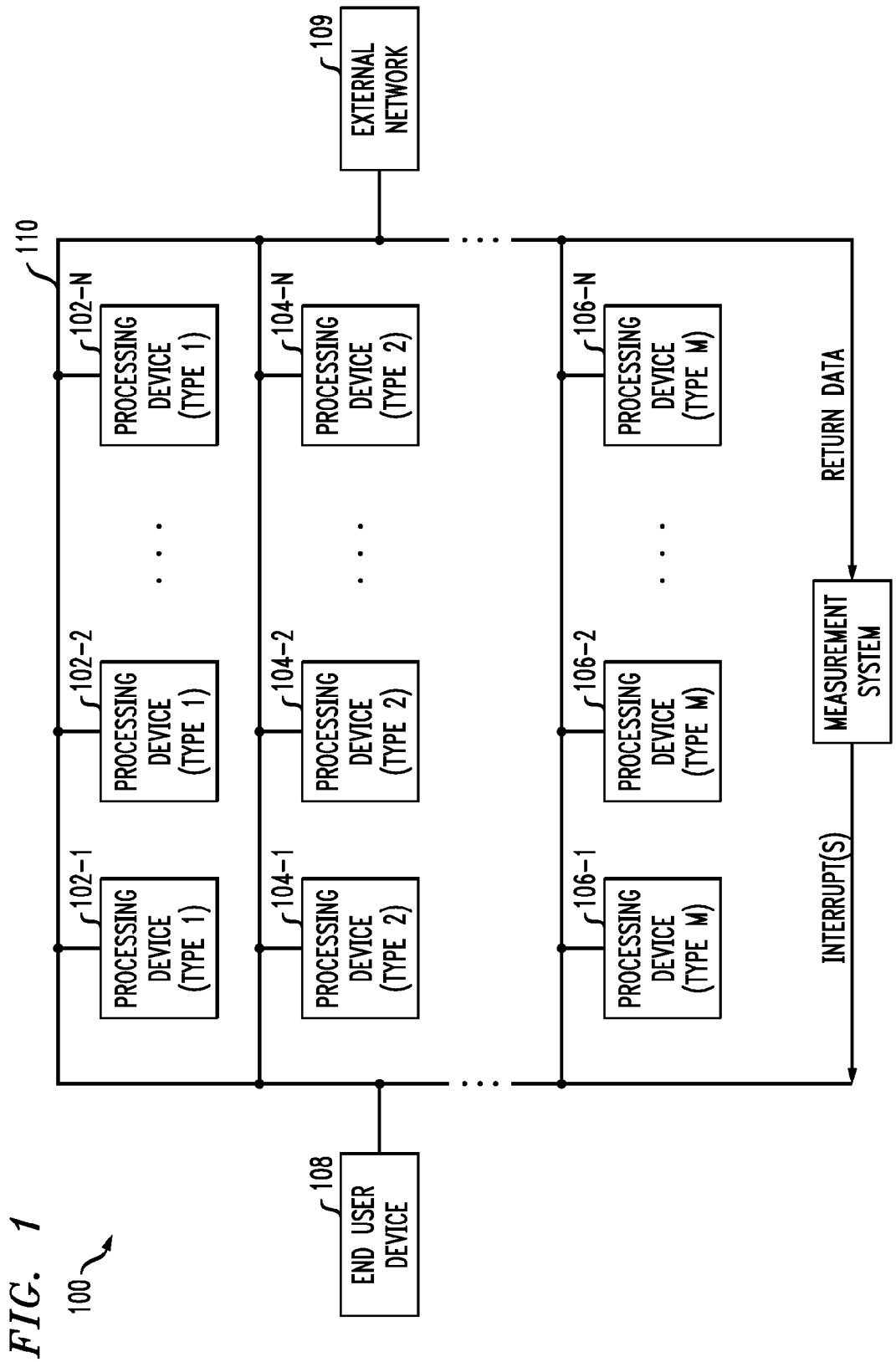
FIG. 1 illustrates a processing system according to one embodiment of the present invention.

Referring initially to FIG. 1, a processing system according to one embodiment of the present invention is shown. Processing system 100 includes a plurality of processing devices, depicted as 102-1, 102-2 . . . 102-N; 104-1, 104-2 . . . 104-N; and 106-1, 106-2 . . . 106-N, where N is a positive integer greater than two. As shown, processing devices 102-1, 102-2 . . . 102-N are of a first type in that they perform a first function in the processing system. Processing devices 104-1, 104-2 . . . 104-N are of a second type in that they perform a second function in the processing system. Processing devices 106-1, 106-2 . . . 162-N are of an M-th type in that they perform an M-th function in the processing system, where M is a positive integer greater than two. It is to be appreciated that the multiple processing devices executing multiple functions represent the fact that in such a processing system, dissimilar processes (functions 1, 2 . . . M) are executing on a multitude of dissimilar platforms (processing devices 102, 104 . . . 106). As an example, the first set of processing devices may be radio controllers while the second set of processing devices may be voice call control boxes, and a third set of processing devices may address control of data sessions. Other processing devices could address the health of the overall system and other specialized system level applications.

As farther shown, end user device 108 is able to communicate with external network 109 via one or more of the plurality of processing devices in processing system 100. In a communications system implementation, end user device 108 may be a communication device of a subscriber and external network 109 may be a public switched telephone network (PSTN). In a computing system implementation, blocks 108 and 109 may represent two user devices seeking to access specific computational capabilities provided by one or more of the plurality of processing devices in processing system 100.

Further illustrated in processing system 100 of FIG. 1 is connection bus 110. It is understood that connection bus 110 generally represents the communication links that interconnect each of the plurality of processing devices with one another and each of end user device 108 and external network 109 to each of the plurality of processing devices. By way of example only, connection bus 110 may represent a local area network, a wide area network, a wireless network, a wired network, or any other network that is suitable for providing communication between all of the components of the processing system.

It is to be understood that in FIG. 1, the number of processing devices shown in processing system 100 and the number of devices accessing the processing system are for illustration purposes only and that more or less processing devices and access devices may be employed.

Still further, FIG. 1 illustrates measurement system 112 coupled to each of the plurality of processing devices in processing system 100 via connection bus 110. It is to be appreciated that measurement system 112 is the focus of the invention in this illustrative embodiment. In one embodiment, measurement system 112 represents a separate computer-based testing tool. As will be explained in further detail below in the context of FIGS. 2A and 2B, measurement system 112 generates a probe or interrupt signal (i.e., "interrupt(s)" as shown in FIG. 1) on a randomized basis that is applied to one, multiple, or all of the processing devices in processing system 100. A system administrator or the measurement system, itself, selects which set of processing devices from the plurality of processing devices are to be tested (i.e., a set under test). In response, each processing device that receives the interrupt signal makes certain data (i.e., "return data" as shown in FIG. 1) available to measurement system 112. The measurement system 112 stores the data in a useful data structure format (e.g., map or table). From at least a portion of the return data, the measurement system determines the percentage of real time actually consumed by each program (or portion of a program, i.e., module or routine) running on each processing device under test. This actual performance measurement can then be compared to predicted allocations to decide whether a processing device is operating correctly. If a processing device is determined not to be operating correctly (e.g., below expected performance measure), corrective action can be taken.

One advantage of a measurement tool (e.g., measurement system 112) that is separate from the processing devices being tested is that a system administrator is able to obtain accurate performance measurements without imposing undue load on and distortion of the activity in the tested processing devices themselves.

Further, one reason for generating the probe or interrupt signal on a randomized time basis is so that a synchronization problem is avoided with each processing device being tested. That is, if the measurement system attempted to generate the interrupt signal at a time that is synchronized to the timing (e.g., scheduler) of some routine or module being executed in a particular processing device under test, it would likely not be in synchronization with the timing of some routine or module being executed in another processing device under test. Thus, generating a randomized interrupt signal is preferred. Also, when the interrupt signal is being sent to multiple processing devices, the interrupt signal is preferably sent at the same time, i.e., synchronized simultaneously, to each of the multiple processing devices.

Still further, principles of the invention provide that the interrupts be spaced far enough apart in time so that the effect of the interrupt within the processing devices under test has long passed away before another one is generated. While the time spacing between interrupts is adjustable in order to provide randomization and subject to determination based on the particular applications being performed by the processing system, an interrupt spacing of several hundred milliseconds may serve as a sufficient starting point. The measurement system introduces a randomized delay before the start of each actual interrupt in order to allow for a uniform sampling of the target processing devices under study.

Figure 2A:
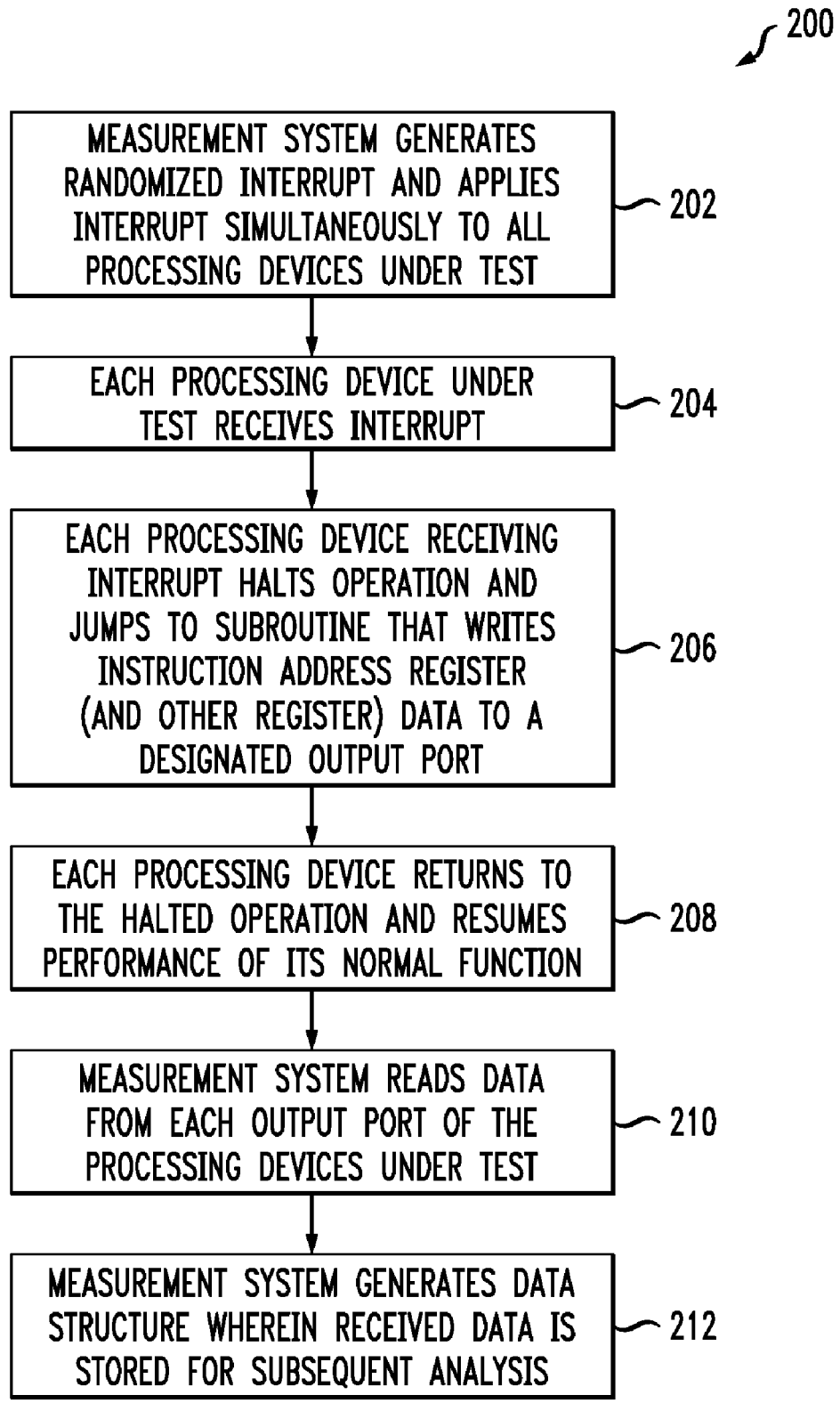
FIG. 2A illustrates a method of measuring performance in one or more processing devices of a processing system according to one embodiment of the present invention.

Referring now to FIG. 2A, a method is shown for measuring performance in one or more processing devices of a processing system according to one embodiment of the present invention. That is, flow diagram 200 of FIG. 2A illustrates a process that is performed between measurement system 112 and one, multiple, or all of the processing devices of processing system 100.

Process 200 begins at step 202, wherein the measurement system generates the randomized interrupt. In step 204, the interrupt is applied simultaneously by the measurement system to all of the processing devices selected to be tested (e.g., set of processing devices under test).

The processing device under study, when interrupted, halts normal operation and jumps to a subroutine that writes the instruction address register and other registers possibly containing information about call record contents, particular internal devices, and particular subscriber devices, to a designated output port (step 206), thus making the register data available to the measurement system. The processing device then returns from the jump to the point it was at prior to the interrupt (step 208). The impact of executing these few instructions is infinitesimal when the interrupts are sufficiently spaced.

In step 210, measurement system 112 reads the data from each of the ports. Failure to receive data within a requisite time would be detected and reported for investigation. The measurement system generates and maintains (step 212) a data structure having a partitioning of separate tables (e.g., a map) of module address boundaries for each processing device under test As an example after being run for a short period of time, we can see the distribution of time spent in each of the six software modules. Module 3 is consuming a significant portion of the available time.

| Index | Module name | Starting address | count |
|---|---|---|---|
| 0 | Module a | 0 | 20 |
| 1 | b | 125 | 500 |
| 2 | c | 245 | 4000 |
| 3 | d | 377 | 7503 |

-continued

| Index | Module name | Starting address | count |
|---|---|---|---|
| 4 | e | 450 | 25 |
| 5 | f | 774 | 67 |
| 6 | g | 1034 | 75 |
| 7 | h | 2237 | 90 |
| 8 | g | 2485 | 124 |

The measurement system increments a counter for each program section.

By way of further example, assume there are 512 buckets allocated for each processing device under test, then the address space for each processing device can be divided into 512 regions. These boundaries are set by software and can be easily reallocated to allow focus on problem areas in a given processing device. Similarly, the content of the other registers may be examined and counted by applying an appropriate filter based on the nature of the condition being studied. Advantageously, this generic capability can be exploited depending on exactly what is being researched.

An example of this may show that the address of one of a collection of particular devices such as radio transceivers is appearing much more often in the sampling than the other radio transceivers in the pool, thus focusing investigation of that particular receiver. Similarly disproportionate capture of addresses of circuits or particular subscriber addresses may also draw investigative attention.

After a suitable period of time, the map collected in measurement system 112 can be read to determine the percentage of real time actually consumed by each program (or module or routine thereof) and compared to the predicted allocations. By way of example, assume 10,000 samples were taken and 100 counts (e.g., a single count may be indicative of a single transaction performed by the processing device) fell into bucket N of the data structure, then it can be can conclude that the processing device under test spent an average of 1% of real time in the module N. Discrepancies can be further investigated by further dividing the boundaries in the area of interest.

If there are indications of time being spent in addresses that should not be hit at all, it is then a simple matter to put a trap on that address in the target processing device and capture the path leading to that address being executed.

Similar analysis can be applied to other register data captured.

Advantageously, by having the interrupts synchronized, it is clear that we are able to study the entire system as a whole at each given instance.

FIG. 2B illustrates a method of measuring performance in one or more processing devices of a processing system according to another embodiment of the present invention.

In general, FIG. 2A illustrates a further capability of measurement system 112. That is, should there be a multi-processing device problem, the measurement system has the ability to immediately capture the relevant data from all of the processing devices involved at exactly the same time. When a processing device encounters the condition of interest (e.g., such as a triggering event set up by insertion of a trap in the executed program code of the processing device), the processing device sends unsolicited data to the measurement system which, in turn, sends an immediate interrupt to all the processing devices. The unsolicited data captured in this case is not part of the mapping, but is presented in relation to the trap, and can shed light on concurrent events. One can then detect concurrent activities, but investigation would then be needed to determine if this is cause and effect, or coincidence.

More particularly, as shown in FIG. 2B, process 220 begins at step 222 wherein a trap is placed in instructions of a program in the processing device under test. In step 224, when the program encounters the trap, the processing device sends an interrupt and relevant data pertaining to subject portion of program to the measurement system. In step 226, the measurement system generates a probe or interrupt signal and applies that interrupt simultaneously to the processing device(s) suspected of contributing to the problem. In step 228, the processing devices receiving the interrupt halt and write relevant data to respective output ports, as described above in the context of FIG. 2A. In step 230, the measurement system reads the data and stores data in a data structure, as described above in the context of FIG. 2A, for subsequent analysis.

Referring lastly to FIG. 3, a computing architecture is shown for a performance measurement system according to an embodiment of the invention. More particularly, it is to be appreciated that computing architecture 300 in FIG. 3 may be used to implement measurement system 112 (FIG. 1) and perform the methodologies of the invention as illustratively described above (FIGS. 2A and 2B). It is also to be appreciated that the computing architecture shown in FIG. 3 may be used to implement each of the processing devices (e.g., 102, 104 and 106 in FIG. 1) and/or any end user devices (e.g., 108 in FIG. 1). However, it is to be understood that principles of the invention are not limited to any particular computing system implementation.

In this illustrative implementation, a processor 302 for implementing at least a portion of the methodologies of the invention is operatively coupled to a memory 304, input/output (I/O) device(s) 306 and a network interface 308 via a bus 310, or an alternative connection arrangement.

It is to be appreciated that the term "processor" as used herein is intended to include any processing units, such as, for example, one that includes a central processing unit (CPU) and/or other processing circuitry (e.g., digital signal processor (DSP), microprocessor, etc.). Additionally, it is to be understood that the term "processor" may refer to more than one processing unit, and that various elements associated with a processing unit may be shared by other processing units.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit. It is to be appreciated that such input devices may be one mechanism to provide inputs used by a system of the invention. Alternatively, the inputs could be read into the system from a diskette or from some other source (e.g., another computer system) connected to the computer bus 310. Also, inputs to the methodologies may be obtained in accordance with the one or more input devices. The output devices may be one mechanism for a user or other computer system to be presented with results of the methodologies of the invention.

Still further, the phrase "network interface" as used herein is intended to include, for example, one or more devices capable of allowing system 300 to communicate with other computing systems. Thus, the network interface may comprise a transceiver configured to communicate with a transceiver of another computer system via a suitable communications protocol. It is to be understood that the invention is not limited to any particular communications protocol.

It is to be appreciated that while principles of the invention have been described herein in the context of networks, the methodologies of the present invention may be capable of being distributed in the form of computer readable storage media, and that principles of the invention may be implemented, and its advantages realized, regardless of the particular type of media actually used for distribution. The term "computer readable storage media" as used herein is intended to include recordable-type media, such as, for example, a floppy disk, a hard disk drive, RAM, compact disk (CD) ROM, etc.

Accordingly, one or more computer programs, or software components thereof, including instructions or program code for performing the methodologies of the invention, as described herein, may be stored in one or more of the associated storage media (e.g., ROM, fixed or removable storage) and, when ready to be utilized, loaded in whole or in part (e.g., into RAM) and executed by processor 302.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of measuring performance in a processing system which comprises a plurality of processing devices, the method comprising the steps of:
   a measurement system, separate from and coupled to the plurality of processing devices, for generating one or more interrupt signals to be applied in the processing system, wherein each of the one or more interrupt signals to be applied in the processing system, when generated, are generated on a randomized time basis;
   the measurement system applying one of the interrupt signals to a set of processing devices under test, wherein the set of processing devices under test is selected from the plurality of processing devices, such that each processing device of the set under test makes data available to the measurement system, the available data representing data associated with the execution of at least one function performed by each processing device of the set under test; and
   the measurement system obtaining the available data and utilizing at least a portion of the available data to determine a measure of performance associated with each of the processing devices of the set under test.

2. The method of claim 1, wherein the one of the interrupt signals is generated by the measurement system after a random delay expires.

3. The method of claim 2, wherein the random delay is adjustable.

4. The method of claim 1, wherein the one of the interrupt signals is simultaneously sent to each processing device of the set under test.

5. The method of claim 1, wherein the set of processing devices under test comprises one or more of the plurality of processing devices.

6. The method of claim 1, wherein the one of the interrupt signals is generated by the measurement system in response to receipt of data from at least one processing device of the plurality of processing devices.

7. The method of claim 6, the at least one processing device sends the data to the measurement system in response to an occurrence of a triggering event in the at least one processing device.

8. The method of claim 7, wherein the triggering event comprises program code being executed in the at least one processing device reaching a trap set therein.

9. The method of claim 1, further comprising the step of the measurement system maintaining a data structure containing the obtained available data.

10. The method of claim 9, wherein the data structure comprises a partitioning that represents distinct execution modules contained in each of the plurality of processing devices.

11. The method of claim 1, wherein the data made available by each of the processing devices of the set under test at least comprises address register data that is written to a designated output port of each of the processing devices of the set under test such that each of the processing devices of the set under test can return to execution of the at least one function after writing the address register data to the designated output port.

12. The method of claim 1, wherein the determined performance measure represents an actual performance measure such that the actual performance measure can be compared to a predicted performance measure to decide whether each of the processing devices of the set under test is operating correctly.

13. The method of claim 1, wherein the processing system is at least part of a communications system or a computing system.

14. The method of claim 1, wherein the measurement system subsequently generates another interrupt signal and wherein, the interrupt signal, first generated, and the other interrupt signal, subsequently generated, are spaced apart in time such that the effect of the first-generated interrupt signal within the processing device under test has ceased before the subsequently-generated interrupt signal is generated.

15. The method of claim 1, wherein the plurality of processing devices comprise a first set of processing devices and a second set of processing devices, and the processing devices of the first set are similar in type to the other ones of the first set and the processing devices of the second set are similar in type to the other ones of the second set, and the processing devices of the first set are dissimilar in type to the processing devices of the second set, and further wherein the selected set of processing devices under test comprises the first set of processing devices or the second set of processing devices such that the measurement system contemporaneously measures the performance of processing devices of a given type within the plurality of processing devices.

16. The method of claim 15, wherein each of the processing devices of the first set perform a first control function in a communication system and each of the processing devices in the second set perform a second control function in the communication system.

17. Apparatus for measuring performance in a processing system which comprises a plurality of processing devices, the apparatus comprising:

a memory; and a processor separate from the plurality of processing devices, coupled to the memory and operative to: (i) generate one or more interrupt signals to be applied in the processing system, wherein each of the one or more interrupt signals to be applied in the processing system, when generated, are generated on a randomized time basis; (ii) apply one of the interrupt signals to a set of processing devices under test, wherein the set of processing devices under test is selected from the plurality of processing devices, such that each processing device of the set under test makes data available to the measurement apparatus, the available data representing data associated with the execution of at least one function performed by each processing device of the set under test; and (iii) obtain the available data and utilize at least a portion of the available data to determine a measure of performance associated with each of the processing devices of the set under test.

18. The apparatus of claim 17, wherein the one of the interrupt signals is generated by the measurement apparatus after a random delay expires.

19. The apparatus of claim 17, wherein the one of the interrupt signals is simultaneously sent to each processing device of the set under test.

20. The apparatus of claim 17, wherein the one of the interrupt signals is generated by the measurement apparatus in response to receipt of data from at least one processing device of the plurality of processing devices.

21. The apparatus of claim 17, further comprising the step of the measurement system maintaining a data structure containing the obtained available data.

22. The apparatus of claim 17, wherein the data made available by each of the processing devices of the set under test at least comprises address register data that is written to a designated output port of each of the processing devices of the set under test such that each of the processing devices of the set under test can return to execution of the at least one function after writing the address register data to the designated output port.

23. A processing system, comprising:

a plurality of processing devices; and a measurement system separate from and coupled to the plurality of processing devices and operative to: (i) generate one or more interrupt signals to be applied in the processing system, wherein each of the one or more interrupt signals to be applied in the processing system, when generated, are generated on a randomized time basis; (ii) apply one of the interrupt signals to a set of processing devices under test, wherein the set of processing devices under test is selected from the plurality of processing devices, such that each processing device of the set under test makes data available to the measurement system, the available data representing data associated with the execution of at least one function performed by each processing device of the set under test; and (iii) obtain the available data and utilize at least a portion of the available data to determine a measure of performance associated with each of the processing devices of the set under test.

* * * * *